United States Patent [19]
Zboralski et al.

[11] 4,269,615
[45] May 26, 1981

[54] FILTER ASSEMBLY

[75] Inventors: Jon A. Zboralski; Richard C. Tringali, both of Manitowoc; Harry N. Grow, Two Rivers, all of Wis.

[73] Assignee: American Hospital Supply Corporation, Evanston, Ill.

[21] Appl. No.: 776,135

[22] Filed: Mar. 10, 1977

[51] Int. Cl.³ .............................................. B01D 46/00
[52] U.S. Cl. ..................................... 55/480; 55/481; 55/496; 55/503; 55/DIG. 18
[58] Field of Search ................. 55/478, 480, 481, 493, 55/496, 495, 502–506, 508, 511, 490, 422, 475, 385 A, DIG. 18; 210/447; 98/115 LH

[56] References Cited
U.S. PATENT DOCUMENTS

| 565,972 | 8/1896 | Fowler | 210/447 X |
| 1,961,445 | 6/1934 | McCormick | 55/504 X |
| 2,145,683 | 1/1939 | Bostock | 55/478 X |
| 3,001,605 | 9/1961 | Hill | 55/475 X |
| 3,263,704 | 8/1966 | Boisjoly | 55/481 X |
| 3,425,335 | 2/1969 | Black | 98/115 LH |
| 3,442,067 | 5/1969 | Swenson | 55/502 X |
| 3,743,101 | 7/1973 | Schmidt | 210/447 |
| 3,808,777 | 5/1974 | Neumann et al. | 55/592 X |
| 3,841,145 | 10/1974 | Boubel | 55/503 X |
| 3,870,490 | 3/1975 | Landy | 55/502 X |
| 3,986,835 | 10/1976 | Takagi | 98/115 LH X |
| 4,023,944 | 5/1977 | Beane | 55/481 |

FOREIGN PATENT DOCUMENTS 861301   1/1971   Canada ........................................ 55/481

Primary Examiner—Kathleen J. Prunner

[57] ABSTRACT

A filter assembly for filtering air comprises a filter housing and a filter which is removably positioned within the housing. The filter housing includes spaced-apart first and second housing portions which are connected by connecting members on opposite sides of the housing, and the filter is positioned between the two housing portions. One end of each of the connecting members is secured to the first housing portion, and the other end of each connecting member is connected to the second housing portion in a manner which permits the second housing portion to be moved along the connecting members toward and away from the first housing. When the second housing portion is moved away from the first housing portion, the filter can be removed.

4 Claims, 15 Drawing Figures

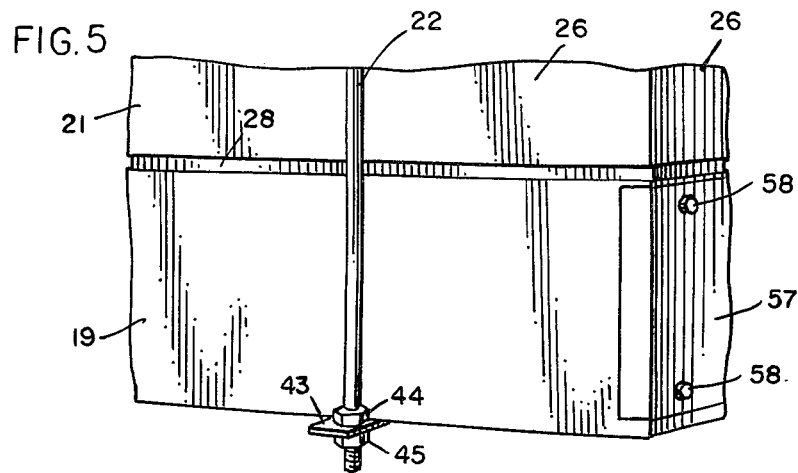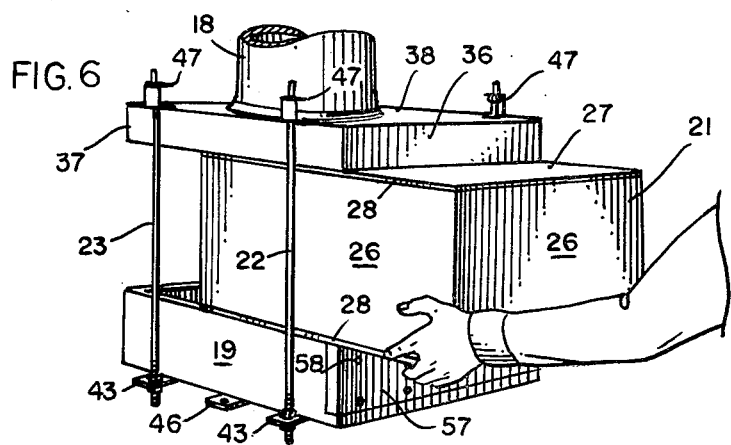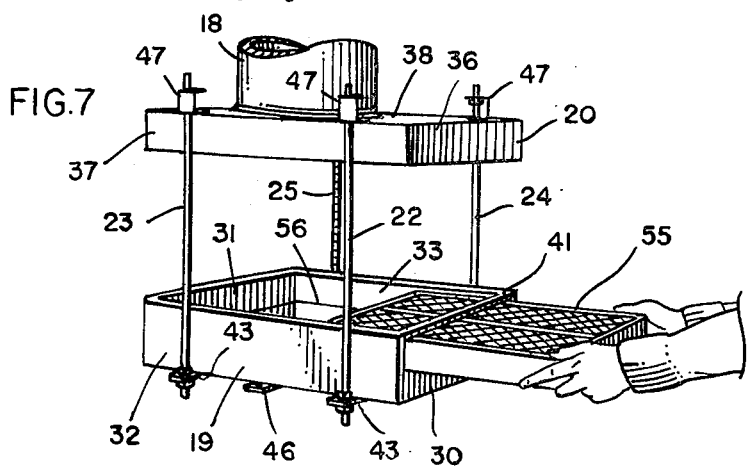

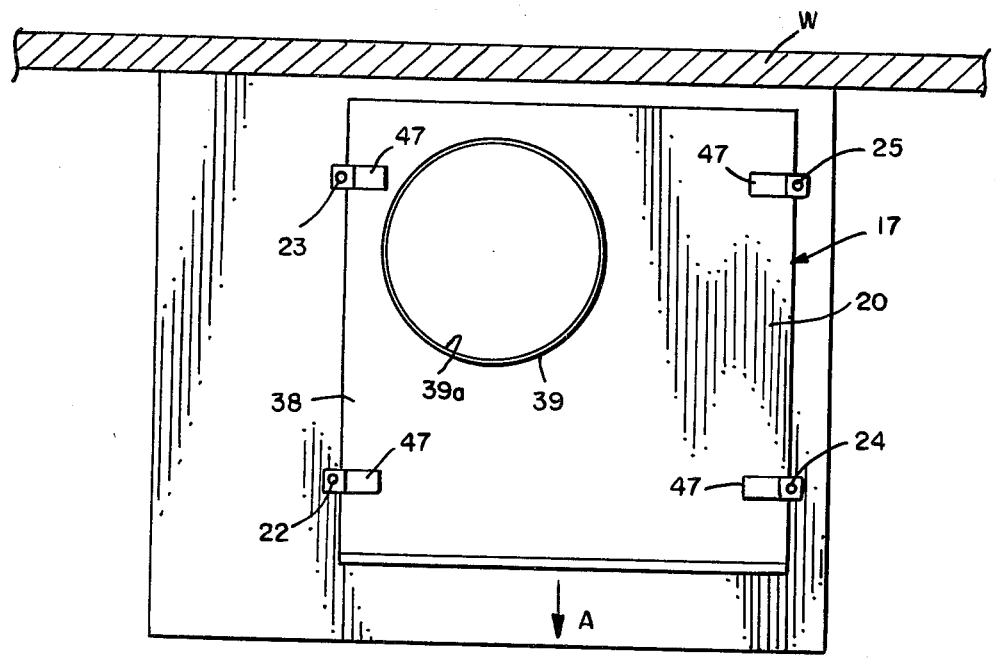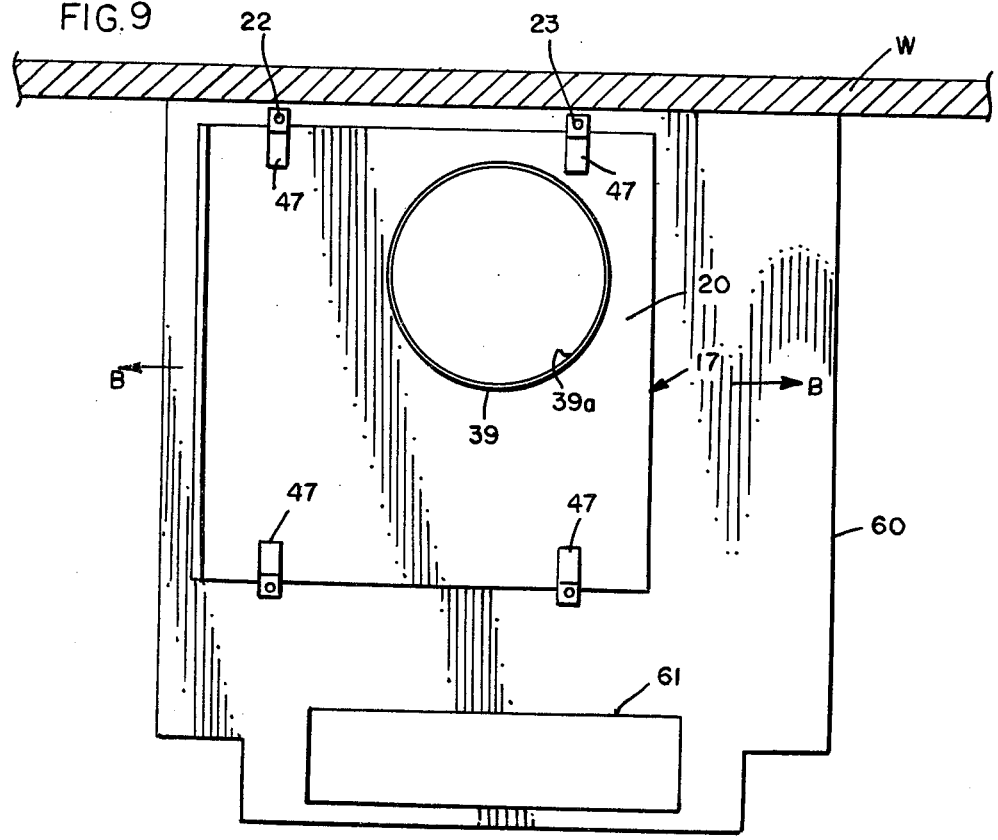

FILTER ASSEMBLY

BACKGROUND AND SUMMARY

This invention relates to a filter assembly for filtering air. Filter assemblies are widely used for filtering air which is either exhausted from an enclosure or supplied to an enclosure. For example, an enclosed room might be provided with an air intake through which air is supplied, or a work area might be provided with an air exhaust through which air is removed. The invention can be used in any environment in which it is desired to filter air, either intake air or exhaust air. However, for purposes of describing a specific embodiment of the invention, the invention will be explained in conjunction with a fume hood.

Fume hoods conventionally include an enclosed chamber which provides a work area where laboratory work with chemicals which give off noxious or malodorous fumes can be carried out. An exhaust duct is connected to the work enclosure, and a blower fan within the exhaust duct withdraws the fumes from the fume hood and expels air into an area remote from the laboratory, for example, outside of the laboratory building.

In order to ensure that the exhaust system does not expel pollutants into the atmosphere, the exhaust system should be equipped with a filter. However, filters which are effective in trapping certain pollutants are often quite cumbersome, and the filters require frequent replacement in order to maintain their effectiveness. The filters are generally interposed in the ductwork so that all of the air exhausted through the ductwork passes through the filter. Accordingly, replacement of the filter generally requires at least partial dismantling of the exhaust system ductwork.

The invention provides a filter assembly which is connected to the ductwork but which permits the filter to be readily removed and replaced while the ductwork remains securely in place. The connecting members which extend between the first and second portions of the filter housing clamp the two housing portions against the filter to maintain an effective seal when the filter is in place. When the filter is to be removed, the second housing portion is moved along the connecting members, and the second housing portion and the ductwork extending from the second housing portion are securely supported by the connecting members.

DESCRIPTION OF THE DRAWING

The invention will be explained in conjunction with an illustrative embodiment shown in the accompanying drawing, in which—

FIG. 5 is an enlarged fragmentary perspective view of the lower front portion of the filter assembly;

FIG. 6 is a fragmentary perspective view illustrating the removal of the filter from the filter housing;

FIG. 7 is a fragmentary perspective view illustrating the removal of a smaller preliminary filter from the lower portion of the filter housing;

FIG. 8 is an enlarged fragmentary top plan view of a fume hood and a filter assembly positioned adjacent a wall with the filter assembly positioned so that the filter is removable in a direction away from the wall;

FIG. 9 is a fragmentary top plan view of an auxiliary air fume hood positioned adjacent a wall with the filter assembly positioned so that the filter can be removed in a direction parallel to the wall;

DESCRIPTION OF SPECIFIC EMBODIMENT

Figure 1:
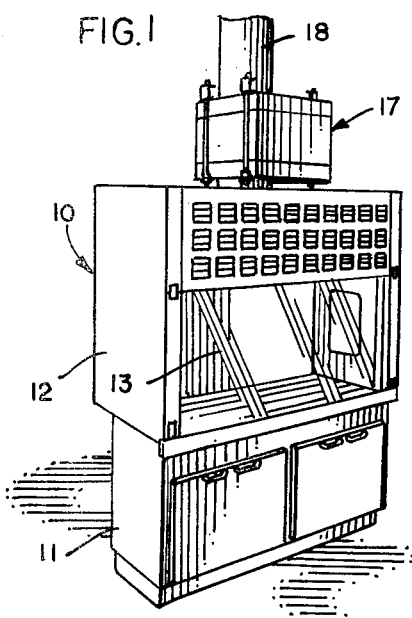
FIG. 1 is a perspective view of a fume hood equipped with a filter assembly formed in accordance with the invention.
Figure 2:
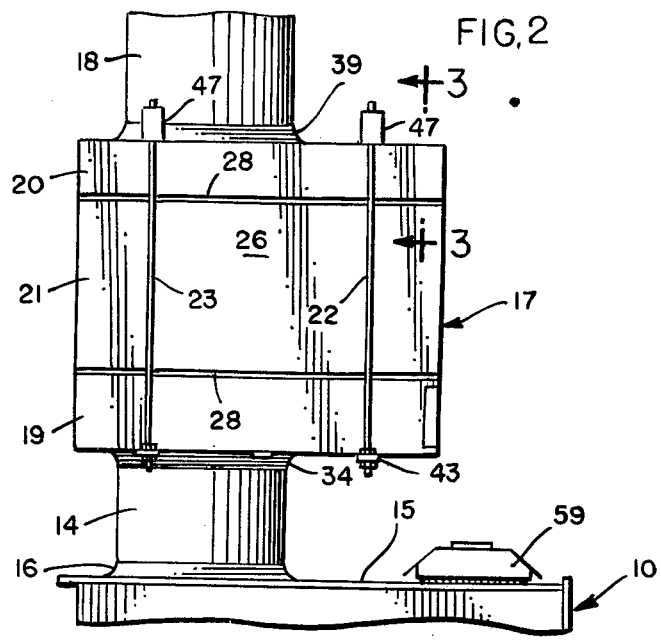
FIG. 2 is an enlarged fragmentary side elevational view of the filter assembly of FIG. 1.

Referring first to FIGS. 1 and 2, the numeral 10 designates generally a conventional fume hood of the type which is generally described in co-owned U.S. Pat. Nos. 3,747,504 and 3,956,977. The fume hood includes a base 11 and a superstructure 12 which provides a work chamber. A glass sash 13 is movably mounted on the superstructure for opening and closing the work chamber.

Air is exhausted from the work enclosure through an exhaust duct 14 which is connected to an opening in the top wall 15 of the fume hood by a mounting collar 16. The air which is withdrawn from the fume hood passes through the exhaust duct 14, through a filter assembly designated generally by the numeral 17, and through an exhaust duct 18. The exhaust duct 18 is part of a conventional exhaust duct system which conveys the air withdrawn from the fume hood to a location outside of the room in which the fume hood is located. An exhaust fan is positioned within the duct-work for withdrawing the air.

The filter assembly includes generally box-like upper and lower filter housings 19 and 20 and a relatively large box-type filter 21 positioned between the upper and lower filter housings. A pair of rigid connecting rods 22 and 23 extend between the upper and lower housing portions on one side of the filter assembly, and a second pair of rigid connecting rods 24 and 25 (FIG. 7) extend between the upper and lower housing portions on the opposite side of the filter assembly.

The box-like filter 21 is a conventional, commercially available filter. The filter includes a rectangular wood frame having a rectangular side wall which is provided by four wood panels 26 and filter material 27 (FIGS. 3 and 4) which is enclosed within the wood frame. The filter material of the filter shown in the illustrated embodiment consists of a plurality of layers of Kraft paper. A gasket 28 is secured to the upper and lower peripheries of the wood frame, and the particular gasket illustrated is formed from a resilient cellular material.

Referring now to FIGS. 6 and 7, the lower filter housing 19 is also rectangular and includes a rectangular side wall provided by a front portion 30, rear portion 31, and opposite side portions 32 and 33, and a bottom wall (not shown). A duct collar 34 (FIG. 2) extends downwardly from the bottom wall for connecting the filter housing to the duct 14.

Figure 4:
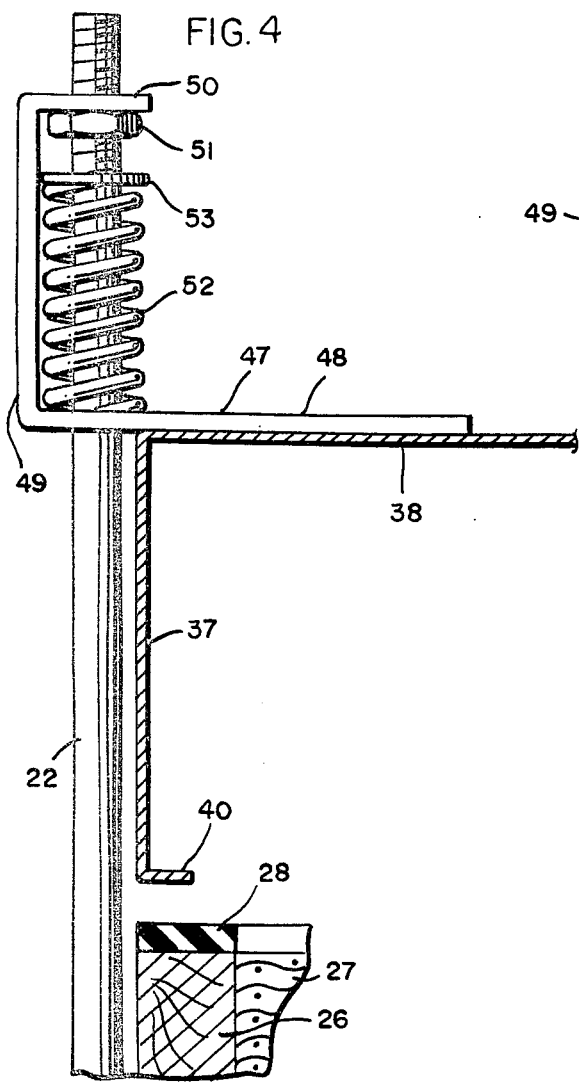
FIG. 4 is a view similar to FIG. 3 showing the upper housing portion raised above the filter.
Figure 3:
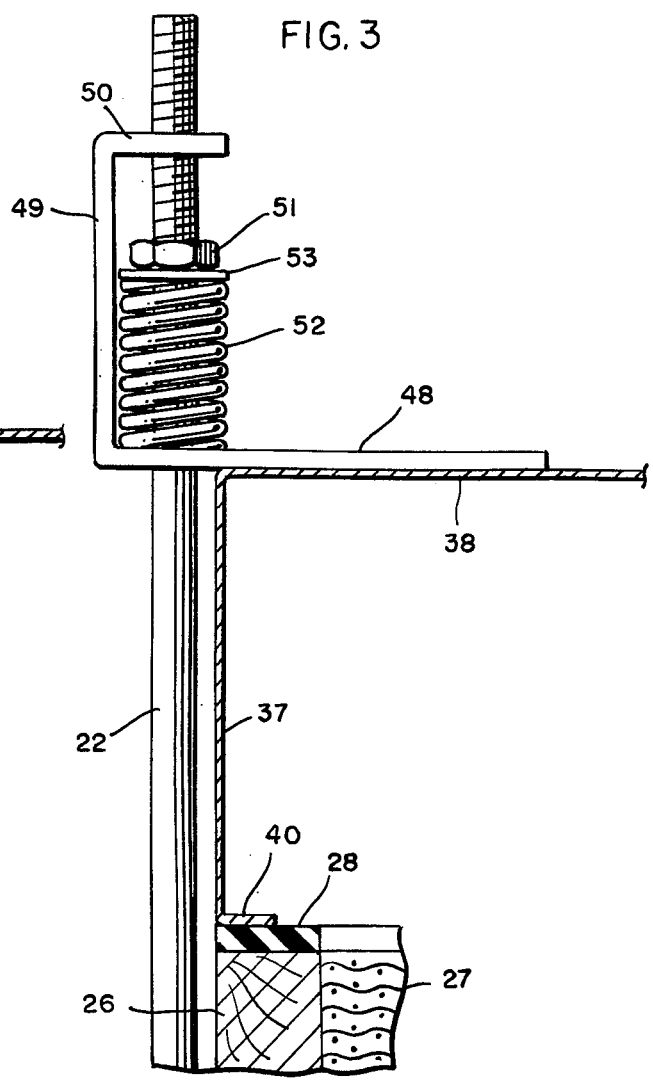
FIG. 3 is an enlarged fragmentary sectional view taken along the line 3—3 of FIG. 2.

The upper filter housing 20 is similarly formed and includes a rectangular side wall formed by a front portion 36, a pair of side portions 37, and a rear portion (not shown), and a top wall 38. A duct collar 39 (FIG. 2) extends upwardly from the top wall 38 for connecting an opening 39a (FIG. 8) in the top wall of the upper filter housing to the duct 18. Referring to FIGS. 3 and 4, a flange 40 extends inwardly from the lower periphery of the upper filter housing and is adapted to sealingly engage the top gasket 28 of the filter. The lower filter housing includes a similar inwardly extending flange 41 (FIG. 7) for sealingly engaging the bottom gasket of the filter. In the particular embodiment illustrated, the generally box-like upper and lower housings were formed from sheet metal.

A pair of mounting brackets 43 (FIG. 5) are secured to the bottom of the lower filter housing and extend laterally outwardly therefrom, and the lower end of each of the connecting rods 22 and 23 extends through an opening in one of the brackets. The lower end of the connecting rod is externally threaded, and the connecting rod is rigidly secured to the mounting bracket 43 by a pair of nuts 44 and 45 which are clamped against the horizontally extending portion of the mounting bracket. The connecting rods 24 and 25 are similarly secured to mounting brackets on the bottom of the lower filter housing on the opposite side. In the embodiment illustrated a third bracket 46 extends outwardly from the lower filter housing between the brackets 43 on each side of the housing. The middle brackets permit the filter assembly to be suspended from the ceiling in those applications in which support from below the filter assembly is not available.

A C-shaped bracket 47 (FIGS. 3 and 4) for each of the connecting rods is secured to the top wall 38 of the filter housing. Each of the C-shaped brackets includes a horizontally extending lower end portion 48 which is secured to the top wall of the upper filter housing and which extends laterally outwardly beyond the side of the filter housing, a vertically extending intermediate portion 49, and a horizontally inwardly extending upper end portion 50 which is spaced from the lower end portion 48. Each of the upper brackets 47 is vertically aligned with one of the lower support brackets 43, and the upper end of each of the connecting rods extends through vertically aligned openings in the horizontally extending portions 48 and 50 of one of the upper brackets.

The upper end of each of the connecting rods is externally threaded, and a nut 51 is threadedly engaged with the connecting rod between the two horizontally extending portions 48 and 50 of the upper bracket. A coil spring 52 is ensleeved on the connecting rod between the nut 51 and the lower portion 48 of the bracket. A washer 53 is positioned between the upper end of the spring and the nut 51.

In FIG. 3 the nut 51 is shown screwed downwardly along the connecting rod 22 to compress the spring 52 and to force the upper filter housing downwardly against the top gasket 28 of the filter. The nuts on the upper ends of the other connecting rods are similarly screwed downwardly, and the filter is thereby securely clamped between the upper and lower filter housings. The perimetric flanges on the upper and lower housings engage the top and bottom gaskets of the filter and seal the filter between the housings. All of the air withdrawn from the fume hood by the exhaust fan therefore passes through the filter material into the exhaust duct 18.

The filter assembly utilizes the rigid sides of the filter 21 as part of the filter assembly. The upper and lower housings sealingly engage the filter, and when the nuts are tightened to clamp the filter between the housings, the filter adds rigidity to the assembly. Accordingly, no additional enclosure around the filter is necessary.

When the filter is to be replaced, the nuts 51 on the upper ends of the connecting rods are screwed upwardly against the upper portions 50 of the upper brackets as illustrated in FIG. 4. The nuts are screwed upwardly until the upper filter housing is raised sufficiently above the filter to permit the filter to be withdrawn from between the upper and lower filter housings as illustrated in FIG. 6. The filter can be removed from either the front of the assembly as shown in FIG. 6 or from the rear.

The upward movement of the filter housing is accommodated either by the normal tolerances in the joints of the ductwork above the filter housing or by a conventional flexible joint which may be used in the upper ductwork. Even though the upper filter housing no longer engages the filter, the upper filter housing and the upper ductwork is securely supported by the four connecting rods. The lower end of each of the connecting rods is rigidly secured to the lower mounting brackets, and substantial swaying or horizontal movement of the connecting rods is thereby prevented.

After a new filter is replaced between the upper and lower filter housings, the nuts 51 can be screwed downwardly to compress the springs 52 and to clamp the housings against the filter. The nuts 51 are located above the top of the upper filter housing and are readily accessible for turning with a wrench. From the foregoing it will be appreciated that the nuts serve as adjusting means for moving the upper filter housing relative to the lower filter housing.

FIG. 7 illustrates the removal of a small preliminary filter 55 which is slidably mounted within the lower housing on a laterally inwardly extending flange 56. The preliminary filter filters the air before the air passes through the large filter 21 and is replaced more often than the large filter. The opening for the preliminary filter is sealed by a front panel 57 (FIGS. 5 and 6) which is mounted on the front wall 30 of the lower housing by screws 58. Additional access panels for the preliminary filter can be provided if desired to permit the preliminary filter to be removed in more than one direction.

Referring now to FIG. 8, the duct collar 39 on the upper housing is located eccentrically with respect to the center of the filter assembly and is positioned adjacent to two of the connecting sides of the filter housing. The duct collar 34 of the bottom filter housing is similarly positioned.

The fume hood 10 illustrated in FIG. 8 and in FIG. 1 differs from the fume hood described in U.S. Pat. Nos. 3,747,504 and 3,956,977 in that the fume hood 10 is not equipped with an auxiliary air inlet. The filter assembly can therefore be positioned so that the filter 21 can be removed from the front of the fume hood in the direction of the arrow A, i.e., in a direction which extends between the two sets of connecting rods 22, 23 and 24, 25. The lower duct 14 raises the filter assembly sufficiently above the top of the fume hood so that the filter can be removed without interference from the light fixture 59 (FIG. 2) which is mounted in the top of the hood and so that the light fixture can be removed without interference from the filter assembly. Positioning the duct collars adjacent the rear of the filter housings permits the rear of the fume hood to be positioned against a wall W in the laboratory without interference from the filter assembly.

The fume hood 60 illustrated in FIG. 9 is an auxiliary air fume hood and is equipped with an auxiliary air inlet duct 61 at the front of the hood for supplying auxiliary air. Since the auxiliary air inlet duct prevents the removal of the filter 21 from the filter assembly 17 in a forward direction, the filter assembly is turned 90° with respect to its position in FIG. 8, and the filter is removable toward either the left or right side of the fume hood in the directions of the arrows B. Since the duct collars 34 and 39 of the lower and upper filter housings are also positioned adjacent the side on which the connecting rods 22 and 23 are mounted, the filter housing can still be positioned against the wall W without interference from the filter assembly.

In the particular embodiment illustrated, the nuts 51 on the upper ends of the support rods were engageable with the upper horizontally extending portions 50 of the support brackets to raise the upper filter housing. However, other means for adjusting the position of the upper filter housing can be used. For example, the upper brackes 47 could include only a single horizontally extending portion, and a nut threadedly engaged with the support rod below the horizontally extending portion of the bracket could be used to raise the support bracket and upper housing by screwing the nut upwardly. The nut 51 and spring 52 could be retained to provide the desired downward sealing force on the filter. A cam device could also be used to raise and lower the upper filter housing relative to the support rods.

From the foregoing it will be understood that many variations from the specific embodiment of the filter assembly can be made without departing from the invention. The important features of the invention include the utilization of two spaced-apart filter housing portions which engage the filter so that the filter becomes part of the housing and connecting members between the spaced-apart housings which support one of the housings and the connecting duct work while the filter is being changed. Some additional embodiments of the invention are shown in FIGS. 10–15.

Figure 10:
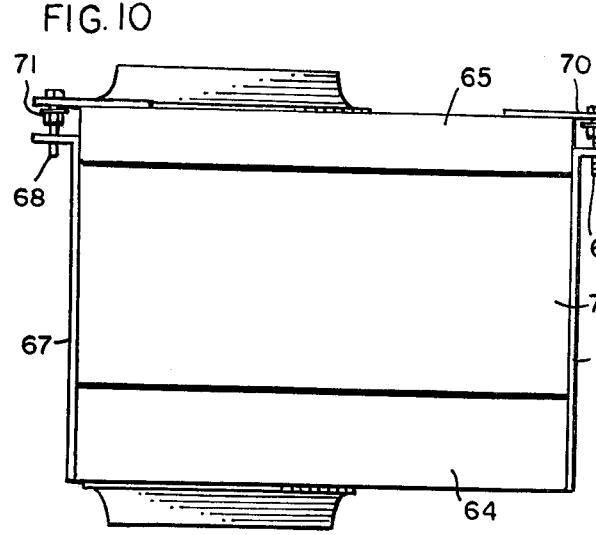
FIG. 10 is a side elevational view of another embodiment of the filter assembly.
Figure 11:
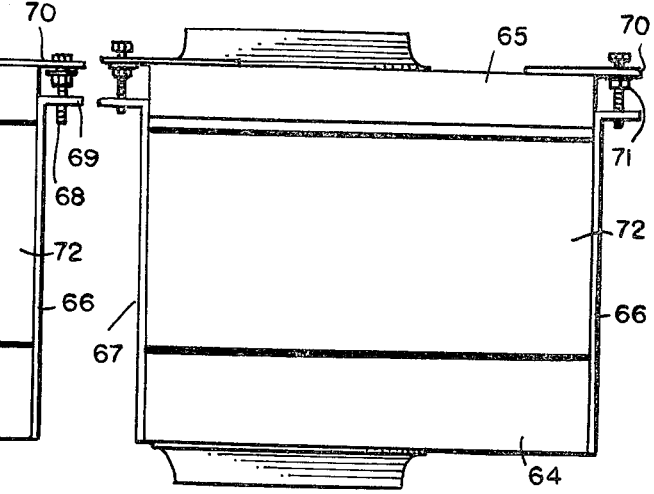
FIG. 11 is similar to FIG. 10 showing the upper housing raised to permit the filter to be removed.

Referring first to FIGS. 10 and 11, spaced-apart first and second housing portions 64 and 65 are connected by means of side panels 66 and 67 rather than the two pairs of connecting rods. The lower end of each of the panels is secured to the first housing portion 64, and a bolt 68 is threadedly engaged with a laterally outwardly extending flange 69 on the upper end of each panel. Each bolt also extends through a bracket 70 secured to the second housing portion 65. A nut is carried on each of the bolts 68 between the flange 69 and bracket 70, and the second housing portion 65 can be raised above the filter 72 by screwing the bolt upwardly so that the nuts 71 engage and raise the brackets 70 as shown in FIG. 11.

Figure 12:
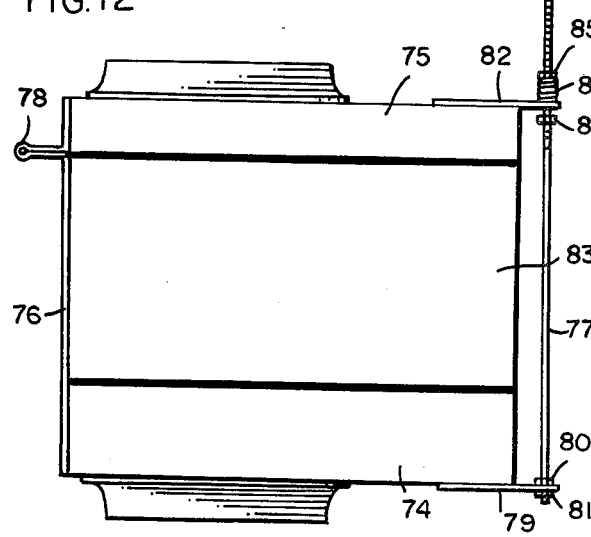
FIG. 12 is a side elevational view of a further embodiment of the filter assembly.
Figure 13:
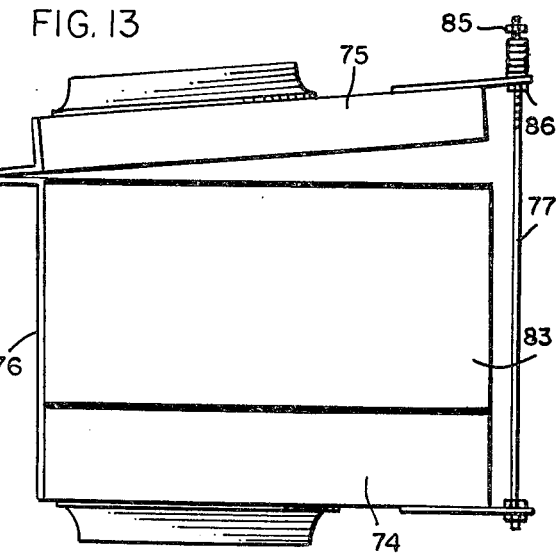
FIG. 13 is a view similar to FIG. 12 showing the upper housing raised to permit the filter to be removed.

FIGS. 12 and 13 illustrate first and second housing portions 74 and 75, connecting panel 76, and connecting rod 77. The connecting panel 76 is secured to the first housing portion 74, and the second housing portion 75 is hingedly secured to the upper end of the connecting panel by hinge 78. The lower end of the connecting rod 77 is secured to a mounting bracket 79 on the bottom of the first housing portion 74 by nuts 80 and 81, and the upper end of the connecting rod 77 extends through a bracket 82 on the second housing portion. The second housing portion is clamped against the filter 83 by spring 84 and nut 85 on the threaded upper end of the connecting rod 77, and the second housing portion can be swung away from the filter about the hinge 78 by screwing the nuts 85 and 86 upwardly along the connecting rod.

Figure 14:
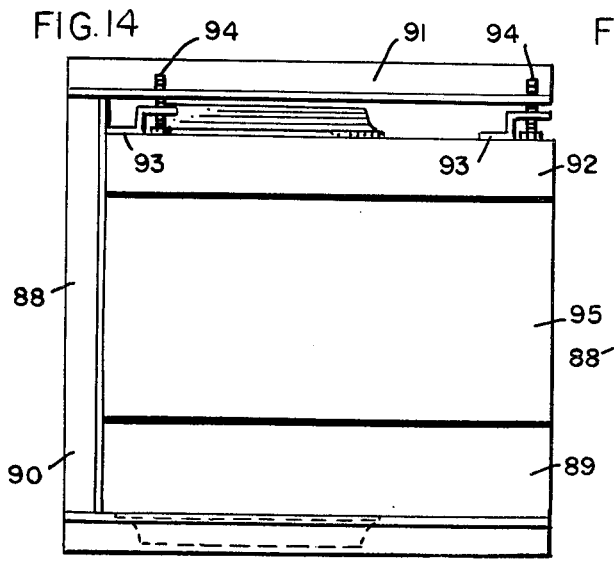
FIG. 14 is a side elevational view of still another embodiment of the filter housing.
Figure 15:
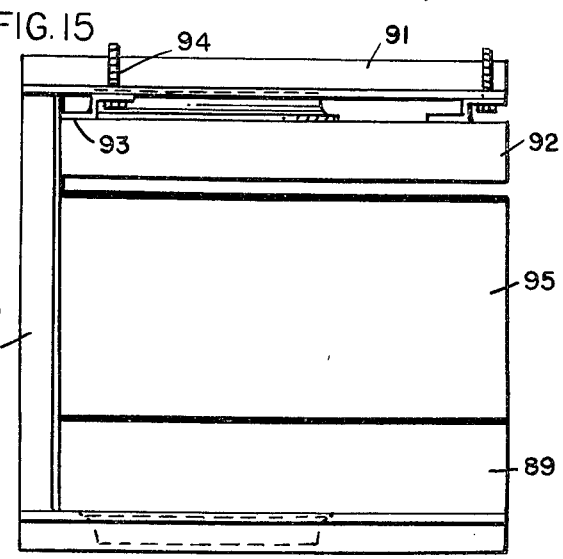
FIG. 15 is a view similar to FIG. 14 showing the upper housing raised to permit the filter to be removed.

A cantilever connecting means for the housing portions is illustrated in FIGS. 14 and 15. An L-shaped cantilever connecting bracket 88 is secured to the lower housing portion 89 and includes a vertically extending portion 90 and a horizontally extending portion 91 which extends over the upper housing portion 92. A pair of Z-shaped brackets 93 are mounted on the top of the upper housing portion, and a bolt 94 extends through each of the brackets and is threadedly engaged with the horizontally extending portion 91 of the cantilever. The bolts 94 are screwed downwardly in FIG. 14 so that the heads thereof engage the upper housing portion and push the upper housing portion against the filter 95. When the filter is to be removed, the bolts are screwed upwardly so that the heads thereof engage the brackets 93 and raise the upper housing portion as shown in FIG. 15. The filter 95 can then be removed in any of three directions.

Many other variations of connecting means and means for moving one of the filter housings relative to the connecting means can be utilized. Although each of the embodiments illustrated has been shown in a position in which the ductwork extends vertically so that the filter is removed in a horizontal direction, it will be understood that the filter assembly can also be positioned so that the ductwork extends horizontally or in any other direction. Since the two spaced-apart housings are clamped against the filter by the connecting means, the filter assembly has sufficient rigidity that it is not necessary to support the various members of the filter assembly on top of each other.

While in the foregoing specification detailed descriptions of a specific embodiment of the invention were set forth for the purpose of illustration, it is to be understood that many of the details herein given may be vared considerably by those skilled in the art without departing from the spirit and scope of the invention.

We claim:

1. A filter assembly for filtering air comprising:
   first and second spaced-apart filter housings, each of the filter housings having a side wall,
   a filter removably positioned between the first and second filter housings, the filter including a side wall having first and second peripheries, the first periphery of the side wall of the filter being sealingly engaged with the side wall of the first filter housing and the second periphery of the side wall of the filter being sealingly engaged with the side wall of the second filter housing,
   a plurality of brackets mounted on said second filter housing,
   a plurality of rigid rods extending between said first and second filter housings, each of said rods having a first end secured to said first filter housing and a second threaded end extending through one of said brackets on the second filter housing,
   a nut threadedly engaged with the threaded end of each rod, movement of the nuts along the rods toward said first filter housing causing said brackets and said second filter housing to be urged toward said first filter housing to clamp the filter between the first and second filter housings, and means for moving said brackets along the rods away from the first filter housing to separate the second filter housing from the first filter housing whereby the filter can be removed from between the filter housings, the second filter housing being connected to the first filter housing by the rigid rods and being supported by the rigid rods when the filter is removed, the rigid rods providing the sole connection between the filter housings when the filter is removed.

2. The filter assembly of claim 1 in which each of the brackets is generally C-shaped and includes a first end portion which is connected to the second filter housing and a second end portion which extends parallel to the first end portion, the threaded end of each rod extending through both the first and second end portions of one of the brackets and said means for moving the brackets along the rods being provided by the upper end portions of the brackets, each of the nuts being movable along the threaded end of a rod into engagement with the second end portion of the bracket through which the rod extends whereby the brackets and the second filter housing can be moved away from the first filter housing.

3. The filter assembly of claim 1 including a spring on each of the rods between the nut on the rod and the bracket through which the rod extends.

4. The filter assembly of claim 1 in which the side wall of each of the filter housings is generally rectangular, at least one of the filter housings being provided with an opening adapted to be connected to a duct, the opening being positioned eccentrically with respect to the center of the filter assembly.

* * * * *